United States Patent [19]

Chang et al.

[11] Patent Number: 4,572,874

[45] Date of Patent: Feb. 25, 1986

[54] POLYTERPENE RESIN COMPOSITION CONTAINING A BLEND OF LOW MOLECULAR WEIGHT POLYETHYLENE BASED POLYMERS

[75] Inventors: Irving B. Chang; Robert E. Beckwith, both of Morristown, N.J.

[73] Assignee: Allied Corporation, Morris Township, Morris County, N.J.

[21] Appl. No.: 684,218

[22] Filed: Dec. 20, 1984

[51] Int. Cl.$^4$ .................... C08L 23/06; C08L 23/08; C08L 23/30

[52] U.S. Cl. ................................. 428/523; 428/500; 525/192; 525/194; 525/210; 525/222; 525/227; 524/490; 524/77

[58] Field of Search ...................... 525/210, 192, 240; 524/490, 77; 428/523

[56] References Cited

U.S. PATENT DOCUMENTS

| | | | |
|---|---|---|---|
| 3,253,059 | 5/1966 | Vollmer | 525/210 |
| 3,256,365 | 6/1966 | Wolinski | 525/240 |
| 3,600,347 | 8/1971 | Godar | 525/210 |
| 3,615,106 | 10/1971 | Flanagan et al. | 525/210 |
| 3,692,877 | 9/1972 | Shibahara et al. | 525/192 |
| 4,140,733 | 2/1979 | Meyer et al. | 525/210 |

OTHER PUBLICATIONS

Exxon Chemicals Brochure, Escorez ® *5000 Resins for Hot-Melt Adhesives.*
Exxon Chemicals Brochure, Escorez ® *Escorez 1315 Petroleum Hydrocarbon Resin.*
Exxon Chemicals Technical Report, Escorez ® *2101 Use in EVA Hot Melt Adhesives.*
Exxon Chemicals Brochure, Escorez ® *5300 Series Resins.*
Exxon Chemicals Brochure, Escorez ® *1304 Petroleum Hydrocarbon Resin.*
Exxon Chemicals Brochure, Escorez ® *1304 Resin-Compatibility with Hot-Melt Ingredients.*
Exxon Chemicals Technical Report, Escorez ® *Resins in Hot Melt Adhesives.*
*Viscosities of Microwaxes with 10% Escorez 1102, 1304 or 5208.*
Exxon Chemicals Brochure, Escorez ® *Resins.*
Hercules Technical Data, Bulletin OR-218, A Look at the Mechanism of Tackification and Suggestions for Designing New Resins, 3/70.
Hercules Product Data, No. 7198-3, Piccofyn ® *A Resins-Functional Hydrocarbon Resins.*
A Handbook for Wingtack, Goodyear Chemicals.
Goodyear Chemicals Tech Book Facts, *Wingtack 95 Tackifying Resin*-4/82.
Goodyear Chemicals Tech Book Facts, *Wingtack 115 Tackifying Resin.*
Goodyear Chemicals Tech Book Facts, *Wingtack 10 Liquid Tackifying Resin.*

*Primary Examiner*—Carman J. Seccuro
*Attorney, Agent, or Firm*—Richard A. Negin; Richard A. Anderson; Patrick L. Henry

[57] ABSTRACT

The present invention is a composition comprising a polyterpene resin and at least two low molecular weight polyolefins as discussed below. The polyterpene resin preferably has a melting point of from about 60° C. to about 150° C. The composition contains from 15 to 40% based on the weight of the polyterpene resin of at least two polyolefin polymers selected from the group consisting of polyethylene homopolymers, polyethylene copolymers and oxidized polyethylene. There is at least one polymer selected from the group of copolymers and oxidized polyethylene.

10 Claims, No Drawings

POLYTERPENE RESIN COMPOSITION CONTAINING A BLEND OF LOW MOLECULAR WEIGHT POLYETHYLENE BASED POLYMERS

DESCRIPTION

BACKGROUND OF THE INVENTION

This invention is in the field of polyterpene resin compositions; more particularly, the invention relates to a composition comprising polyterpene resin and a blend of low molecular weight polyethylene based polymers.

Polyterpene resins are a class of thermoplastic resins or viscous liquids of amber color, obtained by polymerization of turpentine in the presence of catalysts such as aluminum chloride or mineral acids. Polyterpene resins are classified as natural for those made based on turpentine and synthetic for those made based on petroleum products. The resins are based on polymers of alpha- or beta-pinene. The resins are indicated to be useful in paints, wax polishes, rubber plasticizers, curing concrete, and impregnating paper.

Polyterpene resins have been blended with waxes and polymers to make hot melt adhesives as disclosed in the bulletin entitled, "ESCOREZ ® 5000 Resins for Hot Melt Adhesives" published by Exxon Chemical Company. This bulletin discloses formulations which include wax, ethylene vinyl acetate copolymer, and resin. The ethylene vinyl acetate copolymer contemplated has a relatively high molecular weight as indicated by their melt indexes of 2.5 and 25. The waxes are indicated to be paraffin waxes. This bulletin also discloses that a series of blends had been prepared using ESCOREZ ® 5300 with commonly used hot melting ingredients including low molecular weight polyethylene (Epolene C-10) produced by the Eastman Kodak Company. The bulletin disclosed blend ratios of 25/75, 50/50, and 75/25 of resins to modifier. The evaluation was directed to determine compatibility in both a molten state and in thin cast films. The low molecular weight polyethylene was found to be fully compatible in the resin blend. All of the resin blends showed good viscosity stability compared with the "neat" polyethylene, which gelled somewhat on extended aging. Films made of the high resin content blends were brittle.

Polyterpene resins are also known and advertised for use in tackifying compositions Typically, a minor amount of resin is used in such applications. Blends of resin into waxes have been disclosed for use as hot melt coatings. Typically, such blends include the wax as a major component and the resin as a minor component.

In summary, polyterpene resins are useful in adhesive applications such as pressure sensitive adhesives, hot melt adhesives and hot melt coating. Other uses include plastics modification, tackifying, additions to paints, varnishes and printing inks.

A use of particular interest is in hot melt coatings. Hot melt coating compositions are disclosed in the publication "Tech Book Facts, Wing Tack, Wing Tack 95 Tackifying Resin", by the Goodyear Chemical Company, which are useful in the packing industry. It discloses that the polyterpene resin has the distinct qualities of high gloss, heat sealibility, a minimum water vapor transmission rate, and viscosity stability. A typical recipe is indicated to be 20 parts of resins, 25 parts of ethylene vinyl acetate copolymer, and 55 parts of parafin wax.

SUMMARY OF THE INVENTION

The present invention is a composition comprising a polyterpene resin and at least two low molecular weight polyolefins as discussed below. The polyterpene resin preferably has a melting point of from about 60° C. to about 150° C. The composition contains from 15 to 40% based on the weight of the polyterpene resin of at least two polyolefin polymers selected from the group consisting of polyethylene homopolymers, polyethylene copolymers and oxidized polyethylene. There is at least one polymer selected from the group of polyethylene copolymers and oxidized polyethylene. The polyolefin polymers have a number average molecular weight of from about 500 to about 8000, and preferably from about 500 to about 5000. The relative amounts of the polyolefins should be sufficient for the composition to form a film or coating having a glossy surface.

The polyethylene copolymers are preferably selected from the group consisting of the copolymers of ethylene and at least one other unsaturated monomer selected from the group of unsaturated carboxylic acid having 3 to 8 carbon atoms, salts thereof, and esters thereof containing 1–6 atoms in the ester group. The preferred polyethylene copolymers are selected from ethylene acrylic acid copolymer and ethylene vinyl acetate copolymer.

The composition of the present invention includes a coated article comprising a substrate and a coating on the substrate of the recited composition.

DESCRIPTION OF THE PREFERRED EMBODIMENTS

The present invention is a composition comprising a polyterpene resin and at least two low molecular weight polyolefin polymers. At least one of which is a polyethylene copolymer or oxidized polyethylene.

Polyterpene resins are a class of thermoplastic resins obtained by the polymerization of turpentine in the presence of catalysts such as aluminum chloride or mineral acids. Polyterpenes are sometimes classified as being natural polyterpenes derived from wood and synthetic polyterpenes derived from petroleum. Polyterpenes are based on the polymerization of alpha-pinene or beta-pinene. Commerical turpines are substantially based on these pinene moieties.

For the purposes of the present invention, polyterpene resin is characterized by the softening point and preferrably has a softening point in the range of from 60° C. to 150° C., and more preferrably from 90° C. to 140° C.

A preferred polyterpene resin is Wingtack ® 95 Tackifying Resin sold by Goodyear Chemicals and described in the Goodyear publication, "Tech Book Facts, Wingtack, Wingtack 95 Tackifying Resin", revised April 1982, hereby incorporated by reference. Wingtack 95 is described as a synthetic polyterpene resin having a light yellow flake appearance at room temperature, a Gardner color (50% in toluene) of 3, a softening point (ring and ball) 98° C., an ash content of less than 0.1%, an acid number of less than 1.0, an iodine number of 30, a specific gravity of 0.93, and a number average molecular weight of 1200.

Wingtack ® 115 Tackifying Resin is described in "Tech Book Facts, Wingtack, Wingtack 115 Tackifying Resin", published by Goodyear Chemicals Company and hereby incorporated by reference has also been found to be useful in the present invention. This resin has a light yellow flake appearance, a ring and ball softening point of 115°–120° C., a Gardner color (50%) initial value of 7 max. and an aged value (at 5 hours at 350° F.) Gardner color of 12. The specific gravity is 0.94. Of interest is the Goodyear Publication, "A Handbook for Wingtack" which is hereby incorporated by reference and which shows infrared spectra of the various Wingtack type curves which identify resins which are useful in the present invention.

Useful polyterpene resins include ESCOREZ ® resins produced by Exxon Chemicals, and described in the publications ESCOREZ ® 5000 Resins for Hot Melt Adhesives by Exxon Chemicals and hereby incorporated by reference. Other useful Exxon resins include ESCOREZ ® 1304 and 1315 described in Exxon bulletins, ESCOREZ ® 1304 and ESCOREZ ® 1315, both hereby incorporated by reference. The ESCOREZ ® Resins which have been found to be useful are summarized in the following Table 1. Also useful are ESCOREZ 2101 and 2102 which are believed to be vinyl toluene terpene copolymers.

TABLE 1

| Typical Properties | 5380 | 5300 | 5320 | 1304 | 1315 |
|---|---|---|---|---|---|
| Softening Point, °C. | 85 | 105 | 125 | 97–103 | 112–118 |
| Color, Gardner | 1 | 1 | 1 | 7 | 8 |
| Bromine Number, eg/g | 1 | 1 | 1 | — | — |
| Acid Number, ms/KOH/g | <0.1 | <0.1 | <0.1 | — | — |
| Specific Gravity, @ 60/60° F. | 1.1 | 1.1 | 1.1 | 0.97 | 0.97 |

The above data has been taken from the referenced Exxon publications.

Hercules, Inc. produces PICCOFYN ® Resins useful in the present invention. These resins are described as highly alkylated a low molecular weight (400–600) non-reactive phenolic-modified terpene resins. For the purposes of the present invention, terpene resins will include modified terpene resins such as phenolic modified terpene resins. The PICCOFYN resins useful in the compositions of the present invention include PICCOFYN A Resins summarized in Table 2 below. R & B stands for Ring and Ball.

TABLE 2

| | Piccofyn A Resin | | |
|---|---|---|---|
| | A100 | A115 | A135 |
| Softening point, R & B, °C. | 98–103 | 113–118 | 132–138 |
| Color,[a] Gardner, max 70% solids solution in toluene | 8 | 8 | 8 |
| Viscosity[b] at 25° C. | H-L | L-Q | T-X |
| Softening point, R & B, °C. | 100 | 115 | 135 |
| Color, Gardner 70% solids solution in toluene | 7 | 7 | 7 |
| Viscosity at 25° C. | L | P | V |
| Methylol content, % | 0 | 0 | 0 |
| Density at 25° C., lbs/gal (kg/L) | 8.58 (1.03) | 8.58 (1.03) | 8.58 (1.03) |
| Flashpoint, COC, °F. (°C.) | 435 (224) | 445 (229) | 515 (268) |
| Melt viscosity, °C. | | | |
| 1 poise | 190 | 200 | 220 |
| 10 poises | 160 | 170 | 190 |
| 100 poises | 135 | 145 | 165 |

[a]50% resin solids in toluene
[b]Gardner-Holdt

The above listed polyterpene type resins are provided as illustrative examples of resins which have been found useful in the composition of the present invention. The most preferred polyterpene resin has a softening point of from 60° C. to about 150° C.

Polyterpene resins of the type described above are used in coating compositions. In considering a composition for coating, certain properties are of particular concern. Included in these properties are the composition hardness, toughness, surface gloss, and the ability of the composition to maintain the surface gloss and resist scuffing.

The composition of the present invention comprises a polyterpene resin and more than one low molecular weight polyolefin. At least one of the low molecular weight polyolefin components is a polyethylene copolymer or oxidized polyethylene. It has been found that the use of a combination of more than one low molecular weight polyolefin in the composition of the present invention results in the composition retaining its gloss when using greater amounts of polyolefin resin than could be used when using only one polyolefin resin, even having a low molecular weight, combined with a polyterpene resin. The relative amounts of the polyolefins should be sufficient to enable a film or coating made of the composition to have a glossy surface. The gloss value as measured using a 60° Glossmeter should be at least 75 and preferrably at least 80. The composition should also have a balance of the above listed properties. For example, the composition should be glossy yet have a hardness of preferably from 3.5 to 0.2 dmm (ASTM D-5), more preferably 3.0 to 0.5, and most preferably 2.5 to 1.0.

Useful low molecular weight polyolefins include polyolefin homopolymers and copolymers having a number average molecular weight of from 500 to about 8000 and preferrably from 500 to 5000 and most preferrably from 1000 to 3000. The preferred olefin is ethylene; and the polyolefins include low molecular weight polyethylene. At least one of the polyolefins in the composition of the present invention should be a copolymer. Useful copolymers and methods of preparation are disclosed in U.S. Pat. No. 3,658,741 hereby incorporated by reference. This patent discloses copolymers of ethylene and unsaturated carboxylic acids and esters and salts thereof.

The copolymers are preferably homogeneous copolymers of ethylene. Generally, the comonomer combined with ethylene is an unsaturated material. Specific types of comonomers include, but are not limited to, the unsaturated acids, both monocarboxylic and polycarboxylic acids and various salts thereof such as halogen salts, amides, and metal salts, and esters thereof. Useful comonomers include unsaturated monocarboxylic acids containing 3 to 6 carbon atoms in the acid molecule and preferably 3 to 5 carbon atoms. The applicable dicarboxylic acids contain inbetween 4 to 8 carbon atoms and preferably 4 to 6 carbon atoms. Specific examples of unsaturated acids copolymerizable with ethylene include acrylic acid, methacrylic acid, crotonic acid, maleic acid, and fumaric acid. Examples of suitable unsaturated acid salts include acryl chloride and acrylamide. Esters of the acids include esters of the above-specified acid with esters groups containing between 1 to 6 carbon atoms, preferably 1 to 2 carbon atoms. Various substituents, preferably inert ones, may appear in the ester groups. Suitable esters include methyl acrylate, methyl methacrylate, ethyl acryalte, dimethylaminoethyl methyacrylate. Also included in the esters are vinyl esters such as vinyl acetate to form ethylene vinyl acetate copolymers.

The homopolymers and copolymers of the present invention are low molecular weight materials having a number avererage molecular of from 500 to 8000, prefferrably 500 to 5000, and more preferably 1000 to 3000 as measured by a vapor pressure osmometer. The low molecular weight homopolymers and copolymers have a viscosity of from 30 to 8000 and preferrably from 40 to 1500 and more preferrably from 100 to 1200 centapoises at 140° C. Preferred copolymers are homogeneous copolymers of ethylene and a comonomer where there is from 1 to 25% by weight of the comonomer in addition to the ethylene. Preferrably there is from 3.5 to 12% by weight of the comonomer. The polyolefins useful in the present invention preferably have a density in grams per cc's (ASTM D-1505) of from 0.88 to 1.0, and preferrably from 0.91 to 0.99 and more preferrably from 0.925 to 0.945.

The most preferred low molecular weight polyolefins include polyethylene homopolymer, ethylene acrylic acid copolymer and ethylene vinyl acetate copolymer. The following table lists the properties of useful homopolymers, and copolymers.

TABLE 3

| | Softening Pt. (ASTME-28) °C. | °F. | Hardness dmm (ASTM D-5) | Density g/cc (ASTM D-1505) | Viscosity 140° C. (284° F.) (Brookfield) |
|---|---|---|---|---|---|
| Homopolymers | | | | | |
| A | 85 | 185 | 90 | 0.88 | 40 |
| B | 102 | 215 | 7.0 | 0.91 | 180 |
| C | 106 | 222 | 4.0 | 0.92 | 350 |
| D | 107 | 225 | 2.5 | 0.92 | 350 |
| E | 116 | 240 | 1.0 | 0.93 | 400 |
| F | 117 | 243 | 0.5 | 0.94 | 450 |
| G | 129 | 264 | 0.5 | 0.96 | 100 |
| H | 131 | 268 | 0.5 | 0.96 | 550 |
| I | 108 | 226 | 3.5 | 0.90 | 1500 |
| J | 109 | 228 | 2.5 | 0.92 | 4000 |
| K | 108 | 226 | 3.5 | 0.92 | 1400 |
| L | 110 | 230 | 2.5 | 0.92 | 6000 |
| Ethylene - Acrylic Acid Copolymers Acrylic Acid | | | | | |
| A | 108 | 226 | 2.0 | 0.93 | 500 |
| B | 102 | 215 | 4.0 | 0.93 | 650 |
| C | 92 | 198 | 11.5 | 0.93 | 650 |
| Ethylene - Vinyl Acetate Copolymers | | | | | |
| A | 95 | 204 | 9.5 | 0.92 | 550 |
| B | 102 | 216 | 6.0 | 0.93 | 550 |
| C | 101 | 214 | 7.0 | 0.91 | 450 |
| D | 104 | 219 | 4.0 | 0.92 | 450 |
| E | 95 | 205 | 8.5 | 0.91 | 550 |
| F | 60 | 140 | 80 | 0.93 | 600 |
| G | Viscous Liquid | | | 0.94 | 350 |

In addition, polyolefin also includes modified polyolefins such as oxidized homopolymers and copolymers of the type described above. The oxidized polyethylene useful in the composition of the present invention can be prepared by the method disclosed in U.S. Pat. Nos. 3,434,993; 3,322,711; and 3,153,025. Oxidized high density polyethylene which can be used in the composition of the present invention is summarized in Table 4 below.

TABLE 4

| | Softening Pt. (ASTME-28) °C. | °F. | Hardness dmm (ASTM D-5) | Density g/cc (ASTM D-1505) | Viscosity 140° C. (284° F.) (Brookfield) |
|---|---|---|---|---|---|
| Oxidizer Homopolymers | | | | | |
| A | 104 | 219 | 5.5 | 0.93 | 200 |
| B | 107 | 225 | 2.5 | 0.93 | 210 |
| C | 100 | 212 | 9.0 | 0.92 | 185 |
| D | 110 | 230 | 1.5 | 0.94 | 250 |
| E | 111 | 232 | 1.2 | 0.94 | 250 |
| F | 140 | 284 | <0.5 | 0.98 | 30000(1) |
| G | 138 | 280 | <0.5 | 0.99 | 9000(1) |

(1) Viscosity @ 149° C.

There should be from 15 to 40%, preferably 20 to 40%, and most preferably 25 to 40% based on the weight of the polyterpene resin of at least two polyolefin polymers. The polyolefin polymers are selected from polyolefin homopolymers and copolymers and preferrably polyethylene homopolymers and polyethylene copolymers. There is at least one polyolefin which is a polyethylene copolymer or modified polyethylene such as oxidized polyethylene.

In the preferred composition, there is preferably from 5 to 30 parts of one polyolefin and 10 to 25 parts of at least one other polyolefin which is selected from a polyethylene copolymer or oxidized polyethylene.

In addition to the components discussed above, the composition of the present invention can contain additives commonly employed in such resin compositions such a colorants, antioxidents, ultraviolet light stabilizers and the like.

The coating compositions of the present invention have been found to have good toughness, abrasion resistance, intercompatability of the components, adhesion to substrates, and hardness in addition to retaining and obtaining improved gloss properties. A particular advantage is the maintenance of toughness (abrasion resistance) by the use of more of the polyolefin type material while maintaining the gloss which is generally associated with the polyterpene resins. Films and coatings made of the composition of the present invention have been found to have low coefficients of friction and the necessary coat toughness to provide good coatings onto substrates. The films and coatings are clear and low in color and offer good resistance to abrasion.

The above described composition is particularly useful in forming coatings which are coated from the melt. The coatings are useful over printed matter since they are clear and transparent, tough or abrasion resistant and scuff resistant. The composition forms such coatings since they are brittle and can be formed into small particles which are particularly suitable for making such coatings.

Several examples are set forth below to illustrate the nature of the invention and the manner of carrying it out. However, the invention should not be considered as being limited to the details thereof.

In each example, there was between 35 and 50 grams of total material broken down by the appropriate weight percent listed in the table. The blend was physically mixed in a laboratory beaker on a hot plate. The complete melt was mixed until it appeared to be homogeneous. The melt was spread onto a hot dull phosphated steel plate for measurement on the gloss meter. For gloss measurements, the plate was heated to above the melting point of the blend, which was between 150° to 180° C. and cooled to ambient condition. 60° gloss was measured using a 60° GLOSSGARD® II glossmeter manufactured by Pacific Scientific Gardner/Neotec Instrument Division. The procedure used is described in "Instruction Manual®, Glossgard® II Glossmeter" published by Pacific Scientific and hereby incorporated by reference.

The following tests were used in characterizing the various polyolefins: Softening Point, ASTM E-28; Hardness, ASTM D-5; Density, ASTM D-1505. The viscosity was measured as Brookfield viscosity in centipoise at 140° C., unless otherwise indicated. The acid number is the number of milligrams of KOH necessary to neutralize 1 gram of the copolymer.

Table 5 below illustrates Comparatives 1-3 which are films or coatings made using 100% of a low molecular weight polyethylene homopolymer (PE) or copolymer as indicated. The homopolymer used had a softening point of 117° C., a hardness of 0.5 dmm (decimilimeters) a density of 0.94 grams per cubic centimeter and a Brookfield viscoaity at 140° C. of 450 centipoise. The ethylene acrylic acid copolymer (EAA) used had a softening point of 108° C., a hardness of 2.0 dmm, a density of 0.9 grams per cc, a Brookfield viscosity at 140° C. of 500 centipoise and an acid number of 40 miligrams KOH per gram. The ethylene vinyl acetate copolymer (EVA) had a softening point of 95° C., a Table 5 discloses results for Comparatives 1-3 which are EVA, EAA, and PE respectively.

TABLE 5

| Comp | Resin | 100 Pts. | 60° Gloss | Gloss |
|---|---|---|---|---|
| 1 | — | EVA | 38.5 | D |
| 2 | — | EAA | 17.0 | D |
| 3 | — | PE | 11.4 | D |

EXAMPLES 1-9

Examples 1-9 represent compositions of the present invention where the resin in Wingtack 95. Wingtack 95 is a synethetic polyterpene resin manufactured by the Goodyear Chemicals Company and described in the above referenced literature. It is a light yellow flake material having a Gardener color (50% in toluene) of 3, a softening point (ring and ball) of 98° C., less than 0.1% ash, an acid number of less than 1.0 and iodine number of 30, specific gravity of 0.93, and a molecular weight of 1200. Table 6 below summarizes Examples 1-9 which are blends of Wingtack 95 resin and two of the four polyolefins resins which include the polyethylene, ethylene acrylic acid, and ethylene vinyl acetate as described above, and oxidized polyethylene (OPE) "D" from Table 2 above.

TABLE 6

| | Wingtack 95 | PE | EAA | EVA | OPE | Gloss | 60° Gloss | Brittle | Hardness dmm |
|---|---|---|---|---|---|---|---|---|---|
| Ex | | | | | | | | | |
| 1 | 80 | 5 | 15 | — | — | G | | B | 0.2 |
| 2 | 80 | 10 | 10 | — | — | G | | B | 1.8 |
| 3 | 75 | 10 | 15 | — | — | G | | B | 1.0 |
| 4 | 60 | — | 20 | 20 | — | — | 81.2 | | — |
| 5 | 70 | — | 10 | 20 | — | G | 90.3 | | 2.4 |
| 6 | 80 | 12 | — | 8 | — | G | 83.9 | | 0.9 |
| 7 | 75 | — | — | 10 | 15 | G | | | 2.9 |
| 8 | 75 | — | — | 15 | 10 | G | | | 1.7 |
| Comp | | | | | | | | | |
| 4 | 60 | 20 | — | 20 | — | D | 32.3 | | |
| 5 | 80 | — | 20 | — | — | G | 88.9 | | 0.3 |
| 6 | 80 | 20 | — | — | — | D | | B | |
| 7 | 75 | — | 25 | — | — | D | | T | |
| 8 | 70 | 15 | 15 | — | — | D | | | 7.4 |
| 9 | 30 | — | 70 | — | — | D | | | |
| 10 | 65 | — | 35 | — | — | D | | T | |
| 11 | 85 | 15 | — | — | — | G | | B | |
| 12 | 80 | 20 | — | — | — | D | | | |
| 13 | 50 | — | — | 50 | — | D | | | |
| 14 | 55 | — | — | — | 45 | G | | Soft | 3.7 |
| 15 | 60 | — | — | — | 40 | G | | Soft | 4.8 |
| 16 | 75 | — | — | 25 | — | D | | B | |
| 17 | 80 | — | 20 | — | — | D | | B | 0.3 |
| 18 | 70 | — | — | — | 30 | D | | | |
| 19 | 75 | — | — | — | 25 | G | | | 0.3 |
| 20 | 80 | — | — | — | 20 | G | | | 1.4 |
| 21 | 50 | — | 50 | — | — | D | | B | | hardness of 9.5 dmm, a density of 0.92 grams per cc, a Brookfield viscosity at 140° C. of 550 centipoise, and 14% by weight of vinyl acetate moiety. For the purposes of the present invention, satisfactory gloss as measured on using the 60° gloss meter referenced above is a value of 75 or greater. Where gloss was measured purely by visual appearance, G stands for gloss and D stands for dull. Brittleness was measured by the ability to break the composition by hand. B means brittle and T means tough. In general, hard or brittle compositions often give hardness values of 0.2-2.0 whereas softer films gave hardness values of greater than 3.5.

A review of the above data indicates that the blend of polyolefins plus the polyterpene Wingtack 95 results in a material which has properties that are generally better then when using the polyterpene with only one polyolefin. The blend allows more polyolefin to be used while maintaining a satisfactory gloss and brittleness of the material. Additionally, the blended material resists fingernail scuffing and abrasion better than Comparative compositions containing an equal amount of only one polyolefin material. This is illustrated by Comparative 5 in which there are 20 parts of EAA. In Comparative 7, there are 25 parts of EAA. Comparative 5 is glossy and Comparative 7 is dull. Yet, in Example 4, 20 parts of EVA can be added to 20 parts of EAA, and a satisfactory result is obtained.

EXAMPLES 9–16

Table 7 below summarizes results of compositions containing Piccofyn A 135 Resin. Piccofyn resin is described as a highly alkylated, low molecular weight (400–600) non-reactive phenolic-modified terpene resin. Piccofyn A 135 resin is produced by Hercules, Inc. and described in the above-referred publication. Piccofyn 135 resin has the following published typical properties. The softening point (ring and ball) is 135° C.; gardner color is 7; a density at 25° C. of 1.03 kilograms per liter; a melt viscosity of 1 poise at 220° C., 10 poises at 190° C. and 100 poises at 165° C. Table 7 below summarizes the results using Piccofyn A 135 resin.

TABLE 7

| Ex. | PICCOFYN A 135 | PE | EAA | EVA | GLOSS | 60° GLOSS | BRITTLE | HARDNESS dmm |
|---|---|---|---|---|---|---|---|---|
| 9 | 70 | — | 15 | 15 | G | — | B | |
| 10 | 70 | — | 25 | 5 | G | — | B | |
| 11 | 65 | — | 25 | 10 | G | — | B | |
| 12 | 65 | — | 30 | 5 | G | — | B | |
| 13 | 64 | — | 35 | — | G | — | B | |
| 14 | 60 | — | 20 | 20 | G | — | B | |
| 15 | 65 | — | 15 | 20 | — | 94.8 | — | |
| 16 | 70 | — | 10 | 20 | G | — | B | |
| Comp | | | | | | | | |
| 22 | 75 | — | 25 | — | G | | B | 0.2 |
| 23 | 70 | — | 30 | — | G | | B | 3.8 |
| 24 | 65 | — | 35 | — | G | | | 1.6 |
| 25 | 70 | — | — | 30 | G | | B | |
| 26 | 80 | 20 | — | — | G | 96.1 | | |
| 27 | 70 | — | 30 | — | G | 96.4 | | |
| 28 | 60 | — | 40 | — | D | | | |
| 29 | 60 | — | 40 | — | D | | | |
| 30 | 90 | 10 | — | — | G | | | |
| 31 | 80 | 20 | — | — | G | | | 0.9 |
| 32 | 75 | 25 | — | — | G | | | 0.8 |
| 33 | 70 | 30 | — | — | G | | | |
| 34 | 50 | 50 | — | — | D | | | |
| 35 | 30 | 70 | — | — | D | | | |
| 36 | 10 | 90 | — | — | D | | | |
| 37 | 60 | — | 5 | 35 | D | | | |
| 38 | 60 | — | 10 | 30 | D | | | |
| 39 | 60 | — | 15 | 25 | D | | | |
| 40 | 60 | 20 | — | 20 | D | | | |
| 41 | 60 | 25 | — | 15 | D | | | |

With Piccofyn A 135 the surface of the coating was always dull when using 40 or more parts of a single polyolefin. Yet, as Examples 15 and 16 show, combinations of polyolefins have been found which can be added up to the 40 part level and result in a glossy surface.

EXAMPLES 17–20

Examples 17–20 are examples using Escorez 1304. Escorez 1304 is described in the above-referenced bulletin as a petroleum hydrocarbon with typical properties of a melt viscosity at 160° C. of 1100 centipoise and at 150 centapoise (ASTM D3236) a specific gravity 20°/20° C. of 0.97 (ASTM D71 20° C. - IPOH). The results are summarized below in Table 8.

TABLE 8

| Ex. | Escorez 1304 | PE | EVA | EAA | Gloss | Brittle | Hardness (dmm) |
|---|---|---|---|---|---|---|---|
| 17 | 80 | — | 5 | 15 | G | B | 0.5 |

TABLE 8-continued

| | Escorez 1304 | PE | EVA | EAA | Gloss | Brittle | Hardness (dmm) |
|---|---|---|---|---|---|---|---|
| 18 | 75 | — | 5 | 20 | G | | 1.3 |
| 19 | 75 | — | 10 | 15 | G | | 0.7 |
| 20 | 65 | — | 25 | 10 | G | | 2.5 |
| Comp | | | | | | | |
| 42 | 80 | — | — | 20 | G | | 0.7 |
| 43 | 75 | — | — | 25 | D | | 3.5 |
| 44 | 60 | — | 40 | — | G | | 3.9 |
| 45 | 70 | — | 10 | 20 | D | | |
| 46 | 70 | — | 15 | 15 | D | | |
| 47 | 65 | — | 20 | 15 | D | | |

Based on observations of the various Examples, ethylene vinyl acetate copolymers in the composition resulted in a less brittleness. The ethylene acrylic acid copolymers in the composition helped to maintain hardness. The ethylene homopolymers and oxidized polyethylene resulted in more brittle films. Therefore, depending upon the end use the blending of at least two of the polyolefins can balance brittleness and hardness while enabling higher levels of polyolefins to be used and maintaining other properties such as gloss and scuff resistance.

While exemplary embodiments of the invention have been described, the true scope of the invention is determined from the following claims.

What is claimed:

1. A composition comprising:
  a polyterpene resin; and
  from 15 to 40 percent based on the weight of the polyterpene resin of at least two polyolefin polymers selected from the group consisting of polyethylene homopolymers, polyethylene copolymers selected from the group consisting of the copolymer of ethylene and at least one other unsaturated monomer selected from the group of consisting of unsaturated carboxylic acids, salts of said acids, and esters of said acids, and oxidized polyethylene, there being at least one polyolefin selected from polyethylene copolymers and oxidized polyethylene, the polyolefin polymers having a number average molecular weight of from about 500 to about 8,000, the relative amounts of the polyolefins being sufficient to result in the composition which can form a film having a glossy surface.

2. The composition of claim 1 wherein the polyolefin has a molecular weight of from about 500 to about 5,000.

3. The composition as recited in claim 2, wherein the polyethylene copolymers are selected from the group consisting of the copolymer of ethylene and at least one other unsaturated monomers selected from the group of unsaturated carboxylic acid have 3 to 8 carbon atoms, salts thereof, and esters thereof containing 1 to 6 atoms in the ester group.

4. The composition as recited in claim 3 wherein the polyethylene copolymer is selected from the group consisting of ethylene acrylic acid copolymer, and ethylene vinyl acetate copolymer.

5. The composition of claim 2 wherein the polyterpene has a melting point of from about 60° C to about 140° C.

6. The composition as recited in claim 2 having a sufficient amount of polyterpene to form a surface having a gloss value of greater than 75.

7. The composition as recited in claim 2 having hardness of less than 3.5.

8. The composition as recited in claim 5 having a hardness of from 3.5 to 0.2.

9. A coated article comprising:
a substrate, and
a coating on the substrate comprising a polyterpene resin; and from 15 to 40 percent based on the weight of the polyterpene resin of at least two polyolefin polymers selected from the group consisting of polyethylene homopolymers, polyethylene copolymers, selected from the group consisting of the copolymer of ethylene and at least one other unsaturated monomer selected from the group of consisting of unsaturated carboxylic acids, salts of said acids, and esters of said acids, and oxidized polyethylene, there being at least one polyolefin selected from polyethylene copolymers and oxidized polyethylene, the polyolefine polymers having a number average molecular weight of from about 500 to about 8,000, wherein the relative amounts of the polyolefins is sufficient to result in the coating having a glossy surface.

10. The article of claim 10 wherein the coating was a surface having a gloss value of greater than b 75.

* * * * *